(12) United States Patent
Roth et al.

(10) Patent No.: US 11,240,965 B2
(45) Date of Patent: Feb. 8, 2022

(54) MULTI-MATERIAL NEEDLE FOR SQUARE BALERS

(71) Applicant: DEERE & COMPANY, Moline, IL (US)

(72) Inventors: Darin L. Roth, Batavia, IA (US); Matt J. Scott, Ottumwa, IA (US); Eric R. Lang, Newhall, IA (US); Kyle R. Teach, Ottumwa, IA (US); Timothy J. Kraus, Blakesburg, IA (US)

(73) Assignee: DEERE & COMPANY, Moline, IL (US)

( * ) Notice: Subject to any disclaimer, the term of this patent is extended or adjusted under 35 U.S.C. 154(b) by 189 days.

(21) Appl. No.: 16/506,106

(22) Filed: Jul. 9, 2019

(65) Prior Publication Data
US 2020/0137956 A1    May 7, 2020

Related U.S. Application Data

(60) Provisional application No. 62/754,184, filed on Nov. 1, 2018.

(51) Int. Cl.
*A01F 15/14*     (2006.01)
*A01D 59/06*     (2006.01)

(52) U.S. Cl.
CPC .............. *A01D 59/06* (2013.01); *A01F 15/14* (2013.01)

(58) Field of Classification Search
CPC ........ A01F 15/12; A01F 15/14; A01F 15/145; A01D 59/06
See application file for complete search history.

(56) References Cited

U.S. PATENT DOCUMENTS

| | | | | |
|---|---|---|---|---|
| 3,126,815 A | * | 3/1964 | May et al. | A01F 15/12 100/24 |
| 4,102,260 A | * | 7/1978 | White | A01F 15/14 100/24 |
| 4,463,668 A | | 8/1984 | Jackson et al. | |
| 7,458,620 B2 | * | 12/2008 | Rotole | A01F 15/12 289/16 |
| 9,936,646 B2 | | 4/2018 | Demulder et al. | |
| 2016/0021826 A1 | * | 1/2016 | Keller | A01F 15/14 56/432 |
| 2018/0116123 A1 | | 5/2018 | Chaney | |

FOREIGN PATENT DOCUMENTS

EP        3315017 A1      5/2018

OTHER PUBLICATIONS

European Search Report issued in counterpart European Patent Application No. 19205826.1 dated Apr. 3, 2020 (7 pages).

* cited by examiner

*Primary Examiner* — Jimmy T Nguyen
(74) *Attorney, Agent, or Firm* — Taft Stettinius & Hollister LLP; Stephen F. Rost

(57) ABSTRACT

One embodiment of the present disclosure is a multi-material needle assembly for a baler that has a core formed from a first material and a first side formed of a second material and coupled to the core. The first side is positioned at least partially along a wear zone of the core.

20 Claims, 11 Drawing Sheets

MULTI-MATERIAL NEEDLE FOR SQUARE BALERS

CROSS-REFERENCE TO RELATED APPLICATION

This disclosure claims the benefit of U.S. Provisional Application No. 62/754,184, filed Nov. 1, 2018, the contents of which are hereby incorporated herein by reference in their entirety.

FIELD OF THE DISCLOSURE

The present disclosure relates to a needle for a square baler and more particularly to a needle for a square baler formed from multiple different materials.

BACKGROUND

Agricultural balers gather, compress, and shape crop material into a bale. There are different types of balers which create rectangular or square bales or cylindrical or round bales. Bales can be bound with netting, strapping, wire, wrap, or twine. A baler that produces small rectangular bales is often referred to as a square baler. Another type of baler is one that produces large rectangular bales, often referred to as large square baler.

Large square balers have been used in crop harvesting for many years. Large square balers usually utilize a compression system including a gearbox with a crank arm and connecting rod which is attached to a plunger. During each rotation of the crank arm, the plunger compresses the crop in a baling chamber as the plunger moves towards the rear of the baler. Crop is usually metered from a pre-compression chamber into the baler chamber. Large square balers usually include a knotter system for tying twine around the bale before the bale is ejected from the baler chamber. Needles deliver twine through the baling chamber to the knotter system.

A twine delivery needle arrangement of a large square baler includes needles mounted to a needle yoke or frame which is mounted to a baling chamber for pivoting so that twine-carrying tip sections of the needles move upwardly through the baling chamber from a location below the baling chamber to deliver respective lengths of twine to the knotter system. The number of needles used depends on the number of loops needed to adequately bind a bale of a given size, with common bale sizes requiring four to eight loops and thus four to eight needles, for example. During a first half of a tying cycle, the needles are rotated upwardly from a lowered position, wherein the twine-carrying tip sections of the needles are beneath the baling chamber, to a raised position, wherein the twine-carrying tip sections of the needles project into the knotter system. During a second half of the tying cycle, the motion of the needles reverses back to the lowered position. This movement of the needles during a knotting operation is accommodated by vertically aligned needle slots, respectively provided in the bottom and top walls of the baling chamber, a bottom wall of the knotter system, and in the plunger.

A typical needle is constructed of metal and weighs about 20 pounds. A known baler is equipped with six twine-delivery needles which are carried by a yoke which weighs about 150 pounds. Therefore, the total weight of the needle arrangement (weight of needles plus weight of needle support yoke) is about 270 pounds, resulting in substantial torque being required to get the needle system moving, and, thereafter, in substantial inertia being developed as the needles move between the lowered and raised positions.

Another drawback of typical needles is that if the needles are stranded in the bale chamber or are mistimed relative to the stroke of the plunger for compacting crop material in the baling chamber, the plunger will contact the needles and cause damage to one or more of the needles, the plunger, and the knotter system.

SUMMARY

One embodiment of the present disclosure is a multi-material needle assembly for a baler that has a core formed from a first material and a first side formed of a second material and coupled to the core. The first side is positioned at least partially along a wear zone of the core.

One example of this embodiment has a second side formed of the second material and coupled to the core. In another example, the first side is coupled to the core with adhesives. In yet another example, the first material is a composite and the second material is a metal.

In another example of this embodiment the core is coupled to a base at a seam. In one aspect of this example, the base is formed of a different material than the first material. In part of this aspect, the first side is coupled to both the core and the base.

In yet another example the core is coupled to a tip at a tip seam. In one aspect of this example, the tip is formed from a different material than the core. In part of this aspect, the first side is coupled to both the core and the tip.

Another embodiment is a needle assembly for a baler that has a core formed from a first material and at least one surface formed from a second material. The at least one surface is coupled to the core along a wear zone of the needle assembly, the wear zone being a portion of the needle assembly positioned adjacent an opening of the baler during a knotting operation.

In one example of this embodiment, the first material is a carbon fiber and fiberglass reinforced resin, thermoplastic, 3D printed resin, or filament. In one aspect of this example, the second material is formed of a ferrous metallic material.

In another example of this embodiment, the at least one surface has a first surface having a first width and positioned along a radially inner portion of the needle assembly and a second surface having a second width and positioned along a radially outer portion of the needle assembly. In this example, the first width is greater than the second width. In one aspect of this example, the core extends from a base end to a tip end and the cross-sectional area of the core decreases from the base end to the tip end.

Yet another example of this embodiment has a band positioned along a radially outer portion of the core wherein the band is formed of a resistant material and configured to resist wear and guide a binding material there along.

Yet another embodiment is a multi-material needle assembly sized to be positioned through a slot of a baler during a binding operation. The multi-material needle has a core formed from a first material, a first side formed of a second material and coupled to the core, and a second side formed of a second material and coupled to the core. The first and second sides are positioned along wear zones of the needle assembly that are positioned adjacent to the slot during the binding operation.

In one example of this embodiment, the core has a truss-like structure formed therein between the first side and the second side. In one aspect of this example, the core extends between a base seam of a base member to a tip seam of a tip member. In one part of this aspect, the base member and the tip member are formed of a different material than the first material.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 9b is a section view of the needle assembly of FIG. 9a;

Corresponding reference numerals indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
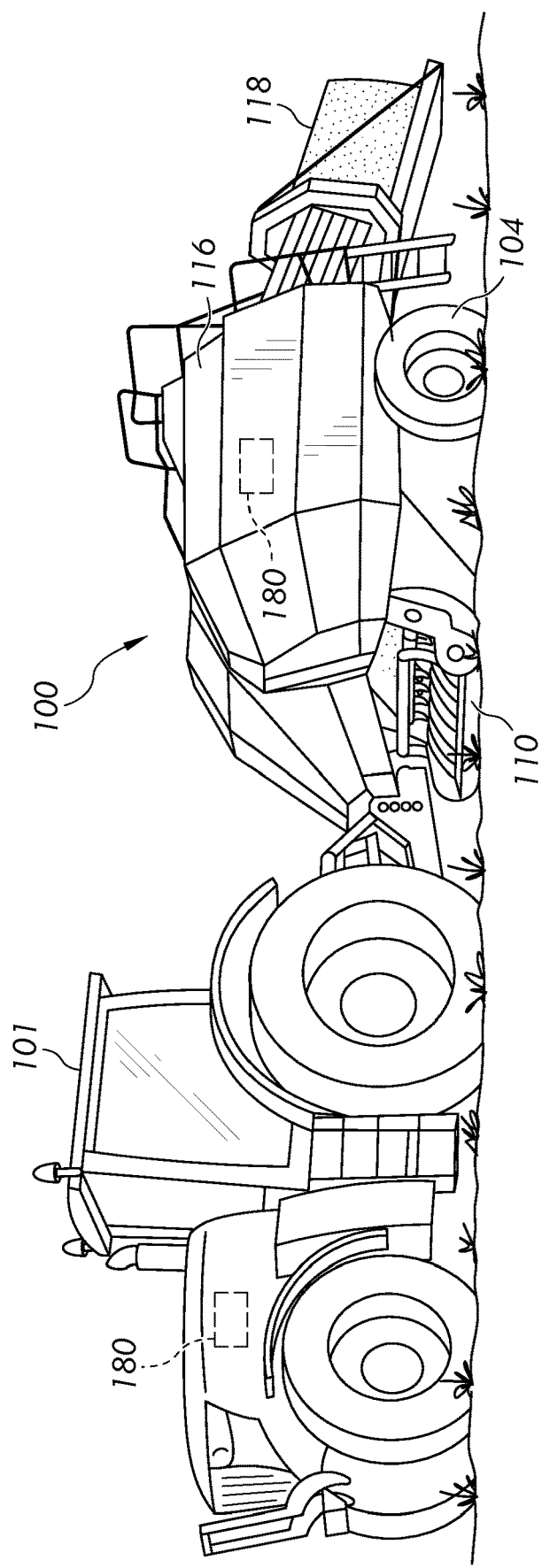
FIG. 1 is a perspective view of an agricultural harvesting machine coupled to an agricultural vehicle.

FIG. 1 illustrates an agricultural harvesting machine 100, such as a baler, according to one embodiment. Although a large square baler is shown, this disclosure also applies to other balers and harvesting machines. The agricultural harvesting machine 100 may be coupled to an agricultural vehicle 101, such as a tractor, or the agricultural harvesting machine 100 may be self-propelled. The agricultural harvesting machine 100 may be combined or integrated with a cotton harvester, a combine, or other harvesting machines. The agricultural harvesting machine 100 and the agricultural vehicle 101 may each include an electronic control unit 180, or controller, having one or more microprocessor-based electronic control units or controllers, which perform calculations and comparisons and execute instructions. The controller 180 may include a processor, a core, volatile and non-volatile memory, digital and analog inputs, and digital and analog outputs. For ease of reference, the remaining description will refer to the agricultural harvesting machine 100 as a baler. As depicted in FIG. 1, the baler 100 may move across a field and gather and process crop material to form a crop package 118, such as a bale. The baler 100 may then eject the bale 118 from the rear of the baler 100.

Figure 2:
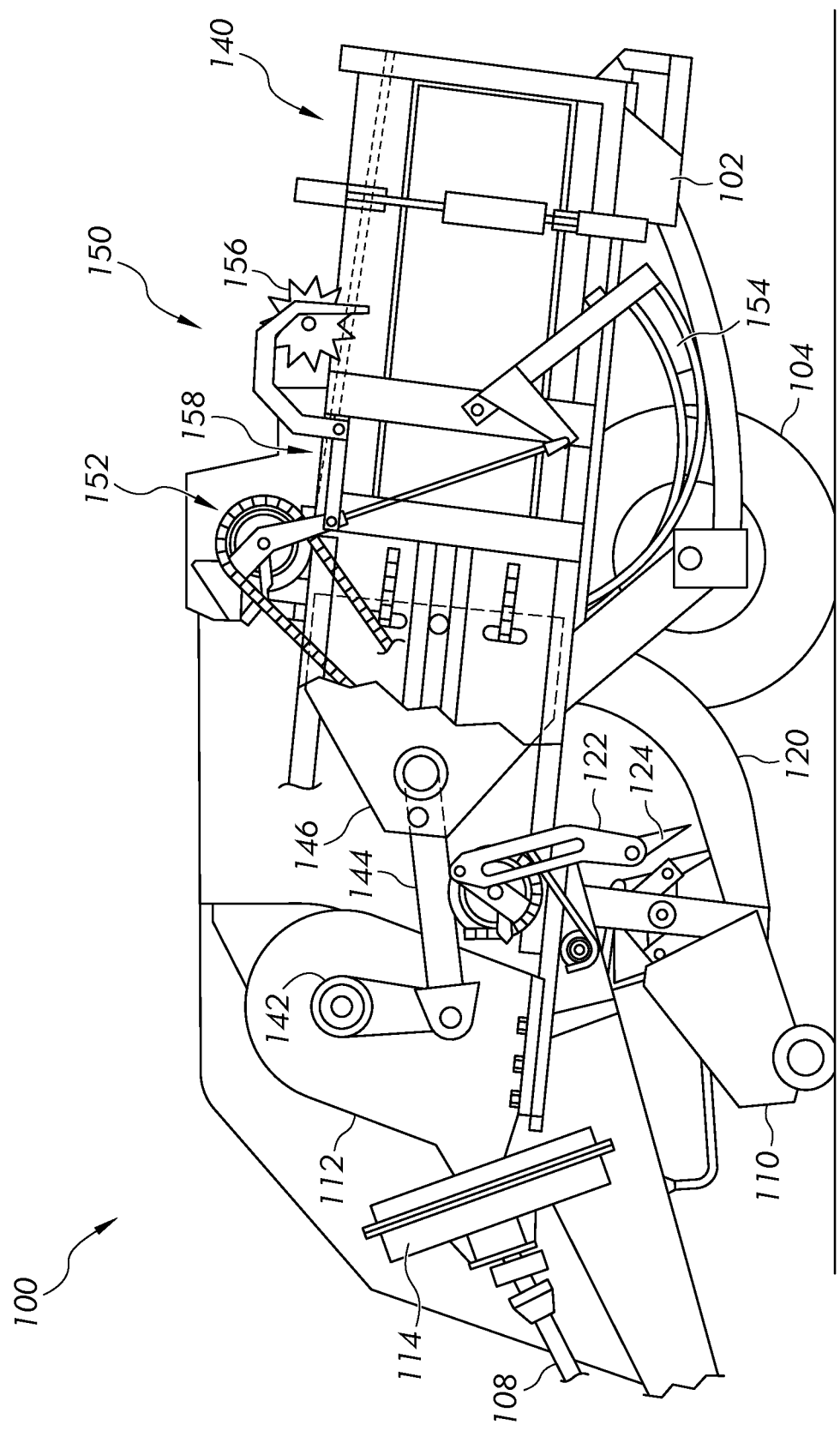
FIG. 2 is a schematic side view an agricultural harvesting machine, according to one embodiment.

With reference to FIG. 2, the baler 100 may include a frame 102, ground engaging devices 104, such as wheels, a hitch for attachment to a tractor or other vehicle, and an input shaft 108, such as a power-take-off (PTO) shaft, which can receive rotational power from a tractor 101, other vehicle agricultural vehicles, or other power sources. As depicted in the FIGURES, for example in FIG. 3, the forward portion or direction of the baler 100 is generally to the left and the rearward portion or direction of the baler 100 is generally to the right. The baler 100 may include a pick-up mechanism 110 which gathers crop material from the ground surface and feeds it into the baler 100. The pick-up mechanism 110 may include various pick-up apparatus including, but not limited to, tines, forks, augers, conveyors, baffles, a cutter or pre-cutter assembly, or any combination of the preceding. The baler 100 may include a housing 116, which generally shields various internal components of the baler 100. The input shaft or PTO shaft 108 may connect to an input of the gear train or transmission 112 providing rotational power to the baler 100 from the tractor 101 or other associated vehicle or power source. The transmission 112 may include a gearbox which converts the rotational motion of the input shaft 108 along a generally longitudinal axis of the baler 100 to a rotational motion along a generally transverse axis of the baler 100. A flywheel 114 may connect to the input shaft 108, the transmission 112, or both. The flywheel 114 can be positioned between the transmission 112 and the input shaft 108, as shown.

The baler 100 may include a pre-compression chamber 120 which receives crop material from the pick-up mechanism 110 and accumulates the crop material until a predetermined fill condition. A loading mechanism 122, or stuffer, moves crop material into the pre-compression chamber 120. The loading mechanism 122 may include projections 124, such as tines or forks, which are inserted or extended into the pre-compression chamber 120, at or near the entrance, to move crop material into and through the pre-compression chamber 120. The projections 124 can then be removed or retracted from the pre-compression chamber 120, at or near the exit, and repositioned at or near the entrance of the pre-compression chamber 120.

The baler 100 may include a crank arm 142 connected to the rotational output of the transmission 112. The baler 100 may include a connecting link 144 connected between the crank arm 142 and a plunger 146. The connecting link 144 may include one or more members connecting the crank arm 142 to the plunger 146. The crank arm 142 rotates based upon the output of the transmission 112 and the plunger 146 moves in a reciprocal motion as the crank arm 142 rotates. The plunger 146 extends into the compression chamber 140 compressing the crop material and then at least partially retracts from the compression chamber 140 to allow more crop material to enter the compression chamber 140.

With reference to FIGS. 2-6, the baler 100 may include a binding or knotter system 150, which binds the compressed crop material in the compression chamber 140 into a crop package, such as a bundle or bale. The binding system 150 may include one or more binding or knotter assemblies 152 and one or more corresponding delivery devices or needles 154, which can deliver binding material to the binding assemblies 152. The binding system 150 wraps and secures a binding material around the compressed crop material, or crop package, during a binding operation.

The baler 100 may include a measuring device 156, such as a star wheel, which measures the length of the compressed crop material within the compression chamber 140. The measuring device 156 may activate the binding system 150 when the compressed crop material within the compression chamber 140 reaches a desired mass, size, or length. The measuring device 156 may activate the binding assembly 152 via a mechanical trip assembly 158. The one or more binding material needles 154 may each move from a lowered position generally below or underneath the baler 100, shown for example in FIG. 4, to a raised position, as shown for example in FIG. 6, passing through a slot 139 in the bottom of the compression chamber 140, a vertically extending slot 149 in the plunger 146, and a slot 141 in the top in of the compression chamber 140. The one or more needles 154 may deliver binding material, such as string or twine, to the binding assembly 152, which secures the binding material around the compressed crop material within the compression chamber 140.

Figure 3:
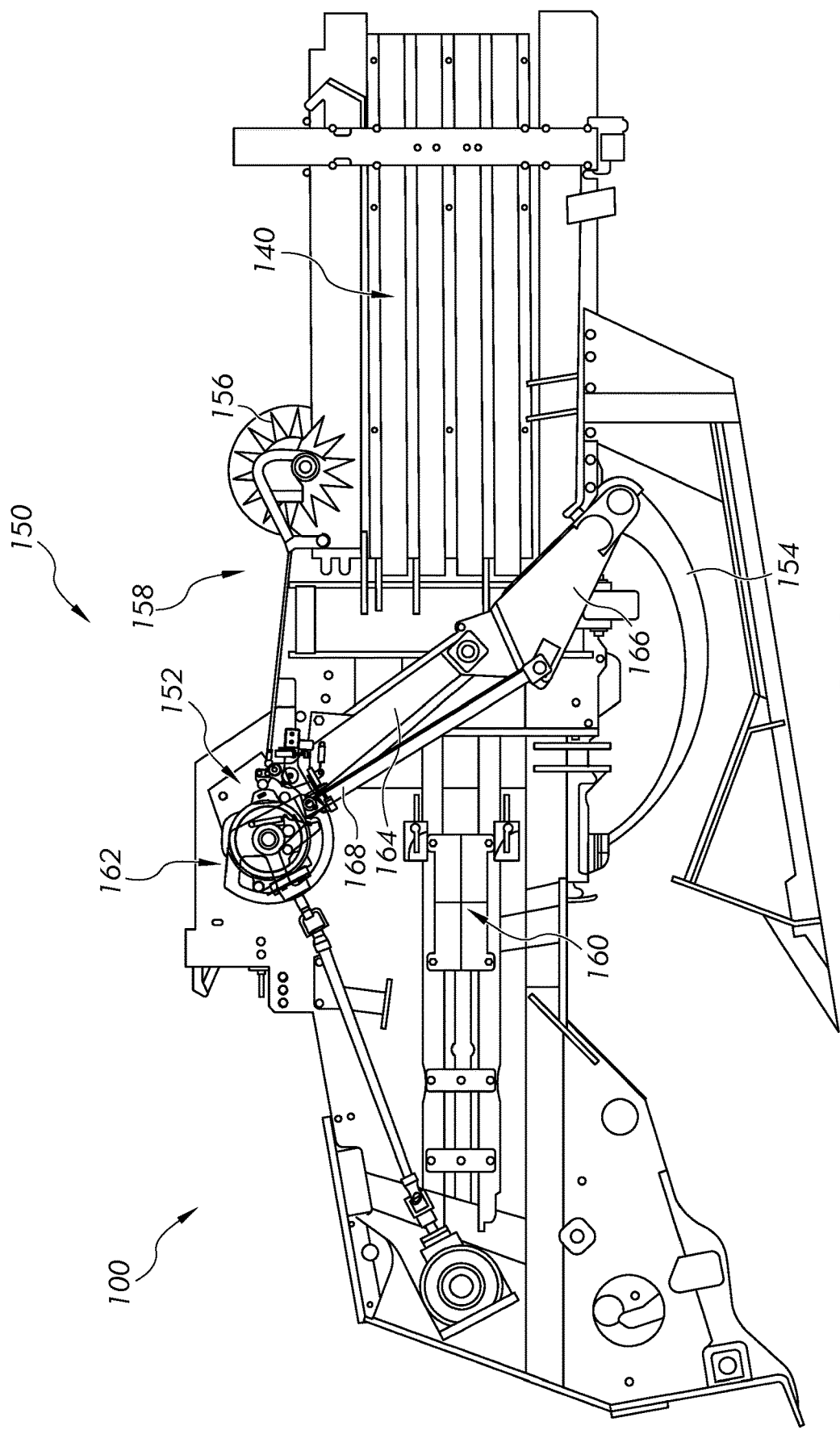
FIG. 3 is a side view of a portion of an agricultural harvesting machine, according to one embodiment.

The binding system 150 may include a delivery mechanism 160 for moving the needles 154 from the lowered position to the raised position, as shown for example in FIG. 3. The delivery mechanism 160 may include a pivoting lift arm 162 and a support member 164 which pivotally supports a delivery or needle frame 166. One or more needles 154 can be coupled to the delivery frame 166. The delivery frame 166 is coupled to the lift arm 162 by a lift link 168. When the pivoting lift arm 162 rotates, the lift link 168 raises the delivery frame 166 and the coupled needles 154 from the lowered position, as shown in FIG. 4, through an intermediate position, as shown in FIG. 5, to the raised position, as shown in FIG. 6.

Figure 4:
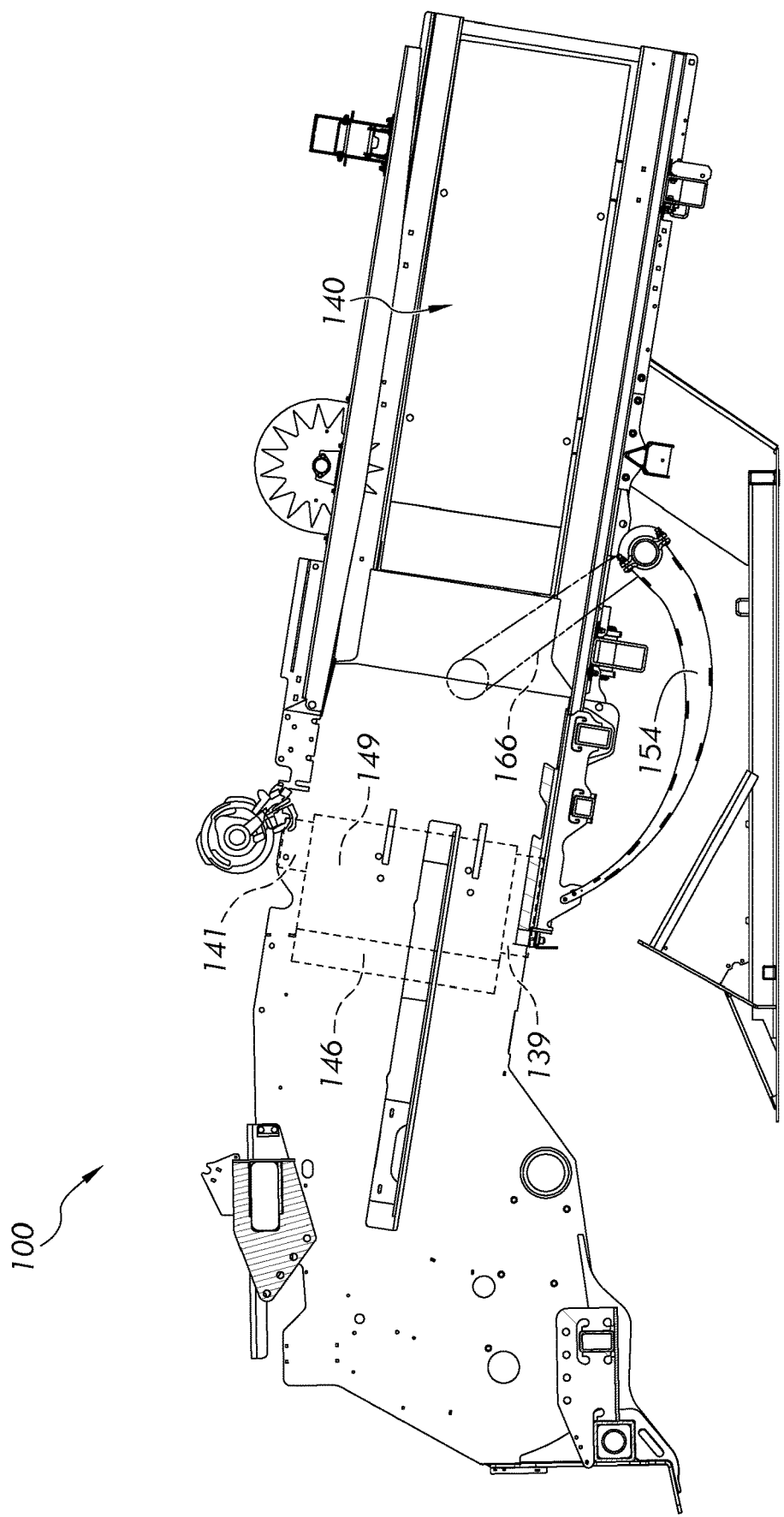
FIG. 4 is a side view of a portion of an agricultural harvesting machine, according to one embodiment.
Figure 5:
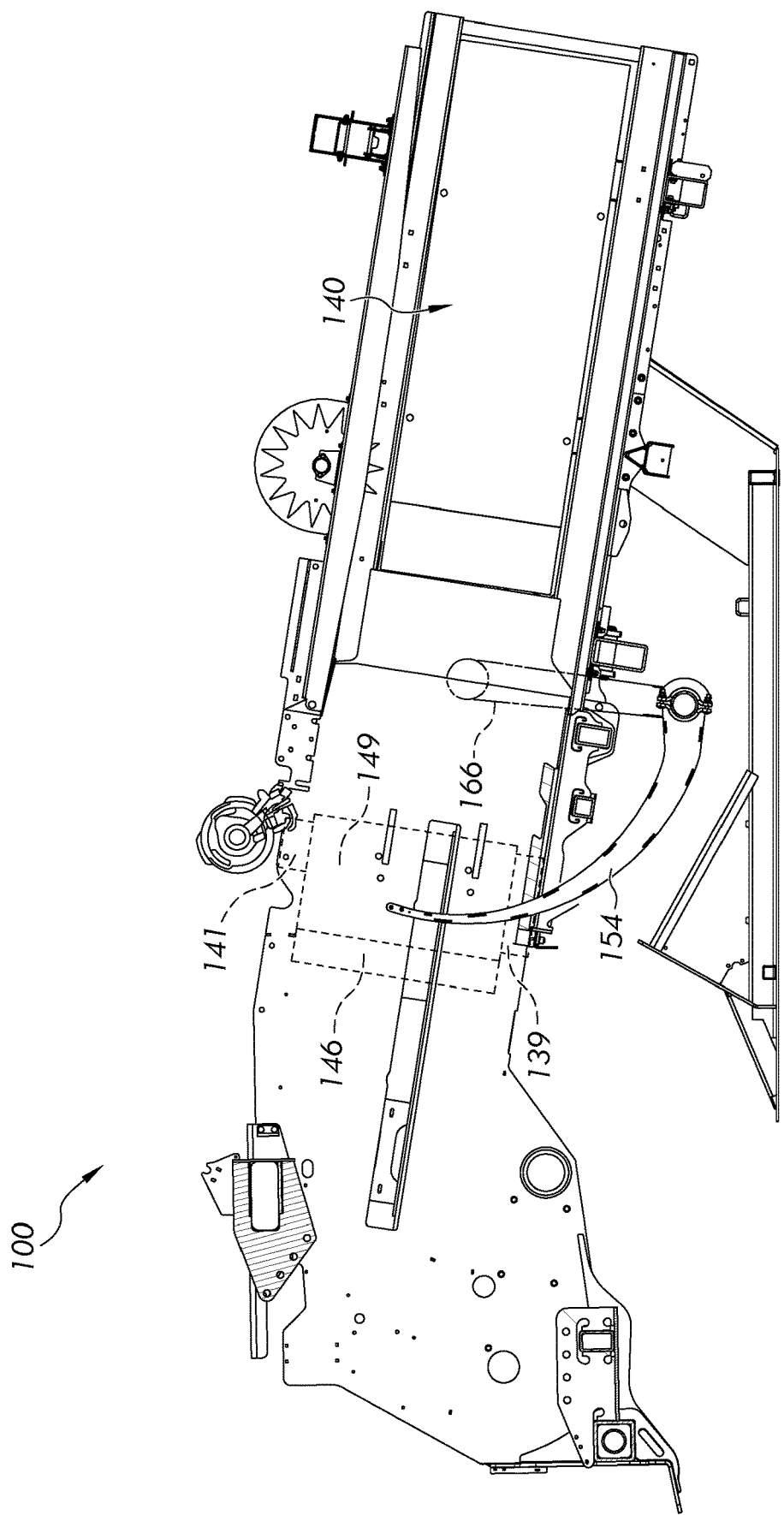
FIG. 5 is a side view of a portion of an agricultural harvesting machine, according to one embodiment.
Figure 6:
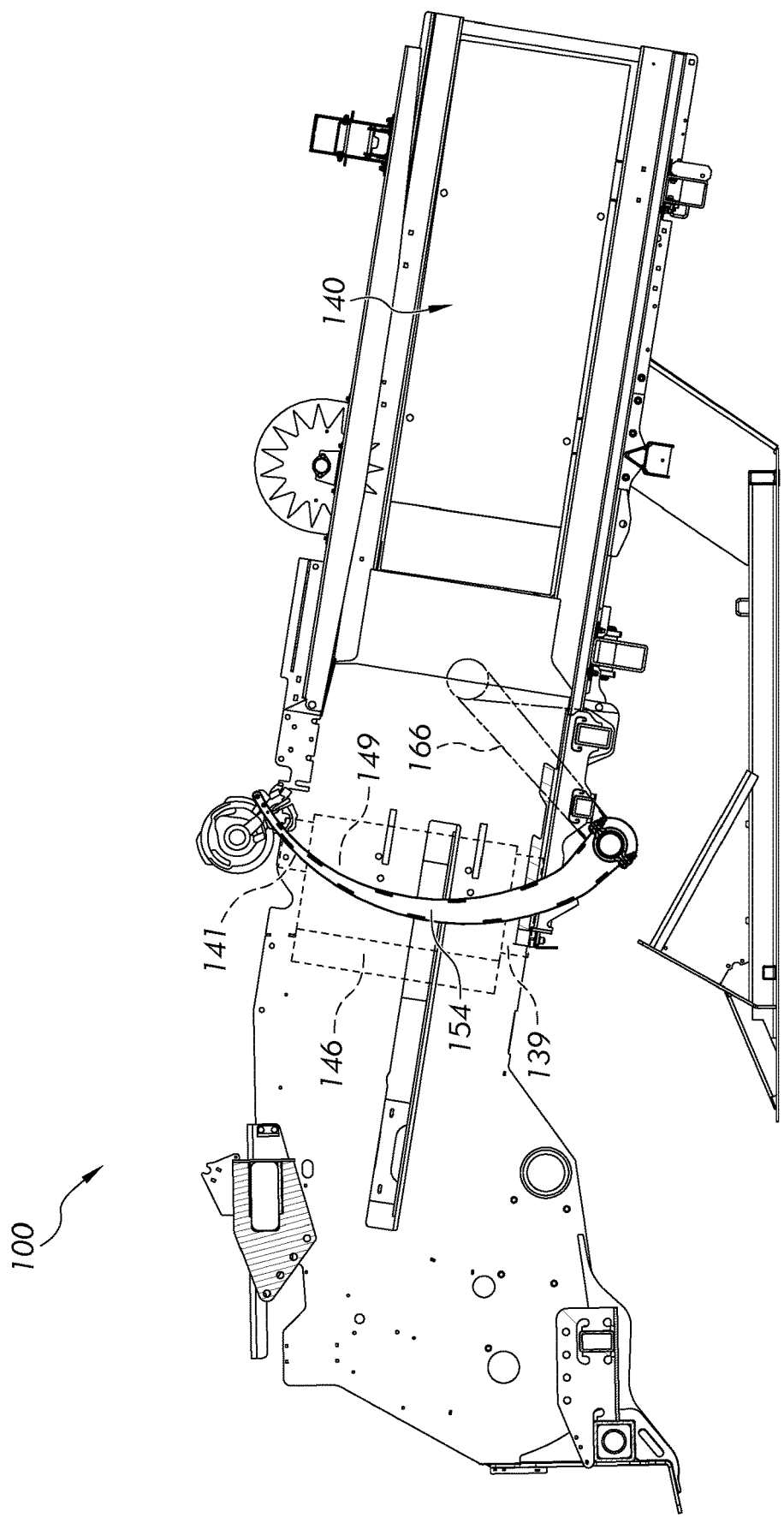
FIG. 6 is a side view of a portion of an agricultural harvesting machine, according to one embodiment.

With reference to FIGS. 4-6, the delivery device 154 wraps binding material around at least a portion of the compressed crop or crop package and provides the binding material to the binding assembly 152. The delivery device 154 remains in the lowered position as the crop material in the compression chamber 140 accumulates to pre-determined quantity, size, or amount. The binding system 150 activates and the delivery device 154 moves from the lowered position up through a slot 139 in the bottom of the compression chamber 140. The delivery device 154 continues to move upward through the compression chamber 140 in front of or forward of the crop material in the compression chamber 140. The delivery device 154 moves through a slot 149 located in a compression surface 147 of the plunger 146, which can be in contact with the crop material in the compression chamber 140. The delivery device 154 continues to move upward through the compression chamber 140 and through the slot 141 in the top of the compression chamber 140 to the binding assembly 152. The delivery device 154 delivers the binding material to the binding assembly 152, which secures the binding material around the compressed crop material within the compression chamber 140. The delivery device 154 then begins moving downward out of the slot 141 in the top of the compression chamber 140 and back through the compression chamber 140. The delivery device 154 moves downward out of slot 139 in the bottom of the compression chamber 140 and back to the lowered position.

The transverse spacing between the needles 154 matches the spacing between respective clearance slots 139, 149, 141. These aligned slots permit the twine-carrying needles 154 to travel upwardly through the compression chamber 140 and project into the knotter assembly 152 as they travel between the lowered position of FIG. 4 and the raised position of FIG. 6, wherein an upper end of each needle is located beside an associated portion of the knotter assembly 152.

A startup torque spike will be generated at the beginning of a tying cycle when a bale has reached a preset finished length sensed by the measuring device 156. It will be appreciated that the startup torque at the beginning of a tying cycle and inertia caused in part by the needles 154 once they begin to move will be proportional to the weight of the needles 154. Therefore, it is desirable that the weight of the needle arrangement be minimized.

The present disclosure has been developed in part in order to reduce the weight of the needles 154 while managing potential wear of the needles. More specifically with reference to FIG. 7, one embodiment of a multi-material needle 700 is illustrated to replace the needles 154 discussed above. The multi-material needle 700 may have a core 702 made of a first material and at least one side sheet 704 made of a second material. The core 702 may be constructed from various composites such as carbon fiber and fiberglass reinforced resin, thermoplastics, 3D printed resin or filaments, and the like to name a few non-exclusive examples.

In one aspect of this disclosure, the core 702 may be formed utilizing a truss-like structure 802 (see FIG. 8) to provide a support for the side sheet 704 to be coupled thereto. The truss-like structure 802 of the core 702 may minimize the amount of material in the core 702 and thereby reduce the weight of the core 702 and in turn the overall weight of the multi-material needle 704. The core 702 may utilize any known construction method for reducing weight while providing a coupling surface for the side sheet 704 and the truss-like structure 802 is only one example of such a construction method.

In one aspect of this disclosure a side sheet 704 may be coupled to the core 702 on both a first side 706 and a second side 708 of the multi-material needle 700. The side sheet 704 may be positioned along wear zones 714 of the multi-material needle 700. Wear zones 714 may be the portions of the multi-material needle 700 that may contact portions of the slots 139, 149, 141 as the multi-material needle 700 transitions between the lowered position of FIG. 4 and the raised position of FIG. 6. By positioning the side sheets 704 along the wear zones 714 of the multi-material needle 700, the core 702 may be substantially protected from contacting other components of the baler 100 as the multi-material needle 700 transitions between the raised and lowered position.

In one aspect of this disclosure, the side sheets 704 may be formed of a material that is resistant to wearing under the expected working conditions of the baler 100. More specifically, the side sheets 704 may be formed of a ferrous material such as steel or the like and positioned along any expected wear zones 714 of the multi-material needle 700. While steel is specifically mentioned, any material that resist wear or that is easily replaceable is considered herein.

The side sheets 704 may extend from a base 710 to a tip 712 of the multi-material needle 700. In one aspect of this disclosure, the side sheets 704 may be sufficiently thick to provide supplemental structural reinforcement to the core 702 to ensure the needle 700 is sufficiently rigid to avoid substantial deformation or deflection during a baling process. Accordingly, the side sheets 704 may both create a wear resistant portion along the wear zones 714 and reduce deflection and deformation of the needle 700.

In yet another aspect of this disclosure, the base 710 may be formed from a separate material than the core 702. The base 710 may be formed of a material suitable to couple the needle 700 to the corresponding portion of the needle frame 166. More specifically, the base 710 may be formed of a metal such as aluminum or steel and be sized to removably couple the needle 700 to a portion of the needle frame 166. Further, the base 710 may be sized so that no portion of the base 710 enters the compression chamber 140 in the raised position. By ensuring that no portion of the base 710 enters the compression chamber 140, the baler 100 may be protected from potential damage in the event that the needle 700 fails to properly exit the compression chamber 140. More specifically, the base 710 may be formed of a stronger material than the core 702, and by limiting the dimensions of the base 710 to ensure the base does not become positioned within the compression chamber 140, the plunger 146 and corresponding components may not be substantially damaged if the needle 700 fails to exit the compression chamber 140 during a wrapping process.

The side sheets 704 may also be coupled to the base 710 along an overlap 716. The overlap 716 may be the portion of the side sheets 704 that extend past a core seam 718 where the core 702 couples to the base 710. The side sheets 704 may transition from the sides 706, 708 of the core 702, past the core seam 718, and to corresponding outer surfaces of the base 710 along the overlap 716. In one aspect of this disclosure, the overlap 716 may provide a coupling surface there along that allows the side sheets 704 to be coupled to the base 710. In one nonexclusive example, the side sheets 704 may be coupled to the base 710 along the overlap 716 with adhesive, welds, brazing, fasteners, soldering, or utilizing any other known coupling method. Accordingly, the overlap 710 may provide an adequate coupling surface to ensure that the side sheets 704 are rigidly coupled to the base 710.

Similarly, the core seam 718 may be a location for the core 702 to be coupled to the base 710. The core seam 718 may be the seam that separates the core 702 and the base 710. Further, the core seam 718 may be a location to couple the core 702 to the base 710 utilizing adhesive, welds, brazing, fasteners, soldering, or any other known coupling method. In one non-exclusive example, the core 702 may have one or more pegs or the like that correspond with one or more hole in the base 710 or vice versa. In this configuration, the pegs may be positioned within the corresponding holes at the core seam 718 when the core 702 is properly positioned relative to the base 710. The peg and hole configuration may be used in addition to, or instead of, the other coupling methods described herein.

The core 702 may also be coupled to the base 710 in part because the core 702 is coupled to the side sheets 704 and the side sheets 704 are coupled to the base 710 as described above. More specifically, the core 702 may also be coupled to the side sheets 704 utilizing adhesive, welds, brazing, fasteners, or any other known coupling method. In this configuration, the side sheets 704 provide a reinforced coupling between the core 702 and the base 710. In one non-exclusive example, the core 702 is coupled to the base 710 both along the core seam 718 and because the core 702 is coupled to the side sheets 704 which are in turn coupled to the base 710 at the overlap 710 as described herein.

The core 702 may also have one or more bands 720 coupled thereto along an outer edge 722. The band 720 may be formed of a different material than the core 702 and selected to resist wear from the binding material as the binding material moves there along. More specifically, during a binding operation the binding material is often moved along the outer edge 722 of each needle 700 to provide the binding material to the knotter assembly 152. This relative movement of the binding material against the outer edge 722 can cause the adjacent surface to wear along the needle 700. Accordingly, in one aspect of this disclosure the band 720 is coupled to the outer edge 722 of the needle 700 in order to prevent the core 702 from experiencing wear caused by the binding material.

The band 720 may be formed of any material that resists wear form the binding material during a binding operation. In one non-exclusive example, the band 720 may be formed of a metal such as steel, aluminum, or any other metal alloy or the like. Further, in other embodiments the band 720 may be formed of a separate material from the core 702 such as carbon fiber and fiberglass reinforced resin, thermoplastics, 3D printed resin or filaments to name a few non-exclusive examples. In yet another example, the band 702 may be formed of the same material as the core 702 but be removable therefrom. The band 720 may also be coupled to the core 702 utilizing adhesive, welds, brazing, fasteners, or any other known coupling method. Further, the band 720 may utilize removable fasteners that allow the band 720 to be easily replaced.

The needle 700 may also have a tip 712 formed from a separate or the same material as the core 702. The tip 712 may be formed of aluminum or a ferrous material such as steel or the like and be coupled to the core 702 in a similar way as the base 710. More specifically, the tip 712 may be coupled to the core 702 along a tip seam 724. Further, the side sheets 704 may extend along a tip overlap 726 to provide reinforced coupling of the tip 712 to the core 702. More specifically, when the tip 712 is a separate material from the core 702, the tip 712 may be coupled to the core 702 along both the tip seam 724 and the tip overlap 726 utilizing similar coupling methods described above for coupling the base 710 to the core 702.

The tip 712 may also have one or more roller 728 coupled thereto. The roller 728 may provide a location for the binding material to be directed out of the tip 712 and into the knotter assembly 152. The roller 728 may be a bushing, bearing, or the like that rotates along a shaft during a binding operation to allow the binding material to transition over the roller 728 as the roller 728 rotates to reduce wear thereon. In one aspect of this disclosure, the material of both the tip 712 and the roller 728 are selected to reduce wear caused by the binding material as the binding material moves there along.

Figure 8A:
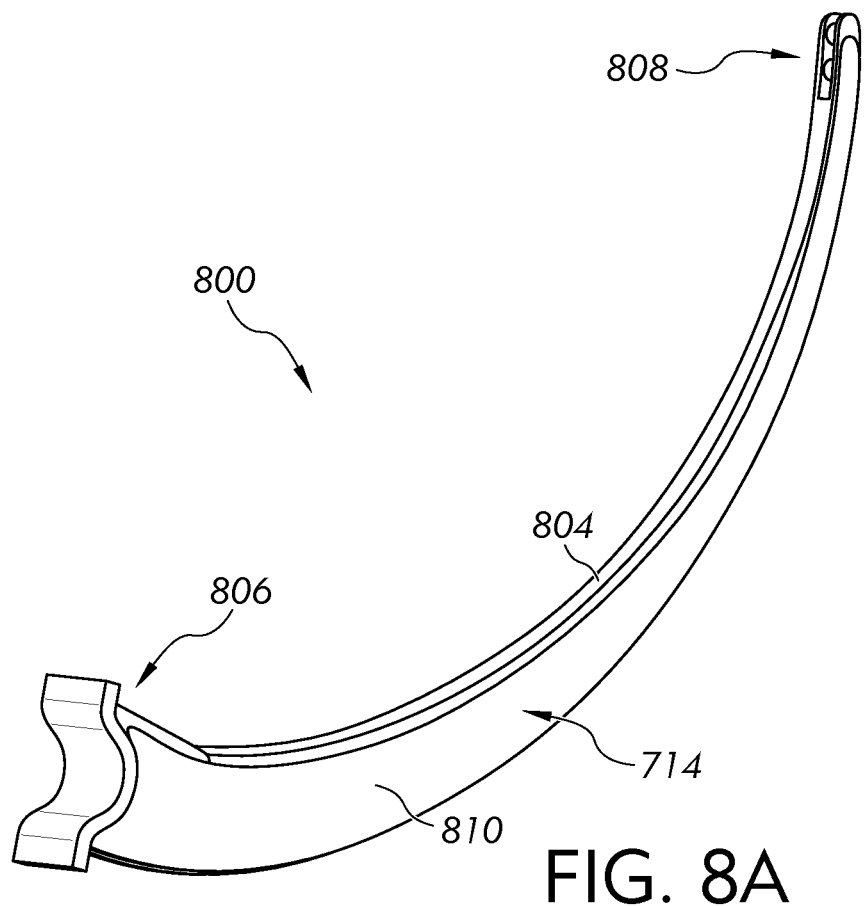
FIG. 8a is an elevated perspective view of a needle assembly, according to one embodiment.
Figure 8B:
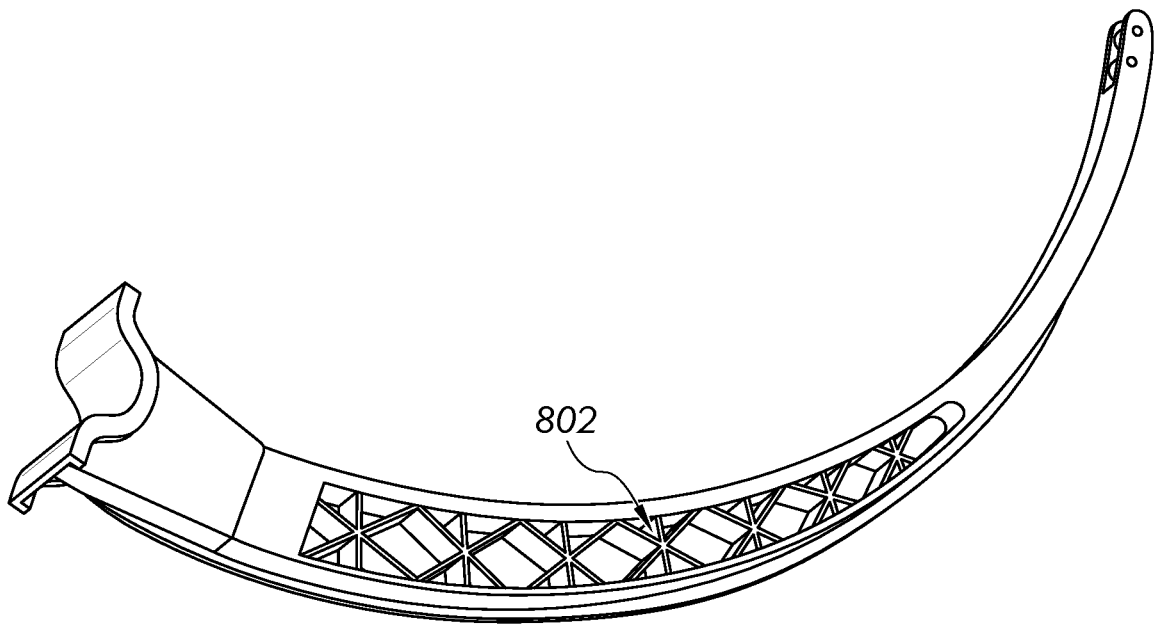
FIG. 8b is an elevated perspective view of the needle assembly of FIG. 8a with a side sheet removed.

Referring now to FIGS. 8a and 8b, another embodiment of a needle 800 of the present disclosure is illustrated. In the embodiment of FIGS. 8a and 8b, a core 804 is integrally formed with a base 806 and a tip 808. In this configuration, the base 806, core 804, and tip 808 may be formed of the same material and the side sheet 810 may extend substantially the length of the needle 800 to at least partially cover a portion of the base 806, the core 804, and a portion of the tip 808. The core 804, base 806, and tip 808 may be formed of carbon fiber and fiberglass reinforced resin, thermoplastics, 3D printed resin or filaments, or the like to name a few non-exclusive examples of material.

In one non-exclusive example the core 804 may have a truss-like structure 802 defined therein. The truss-like structure may reduce the overall weight of the core 804 while providing a coupling surface for the side sheets 810 to be coupled thereto along with sufficient structural strength to execute the binding operation. While a particular truss-like structure 802 is illustrated, this embodiment is meant to be exemplary only, and other similar structures that reduce weight are also considered herein.

Figure 9B:
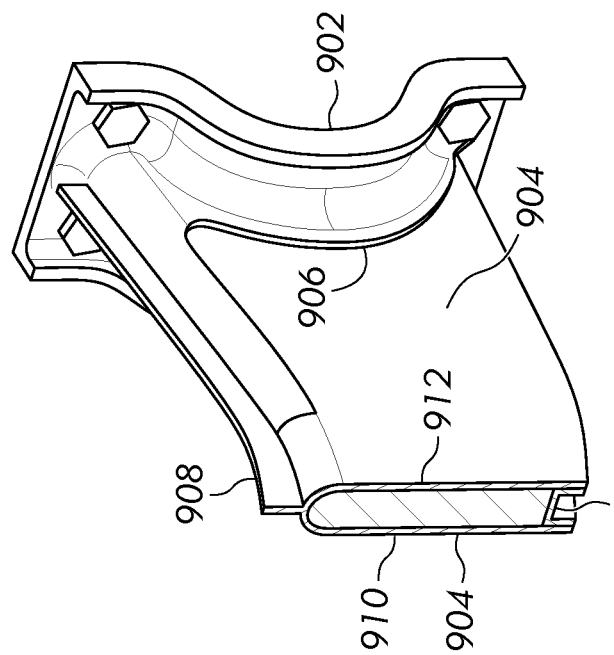
Figure 9A:
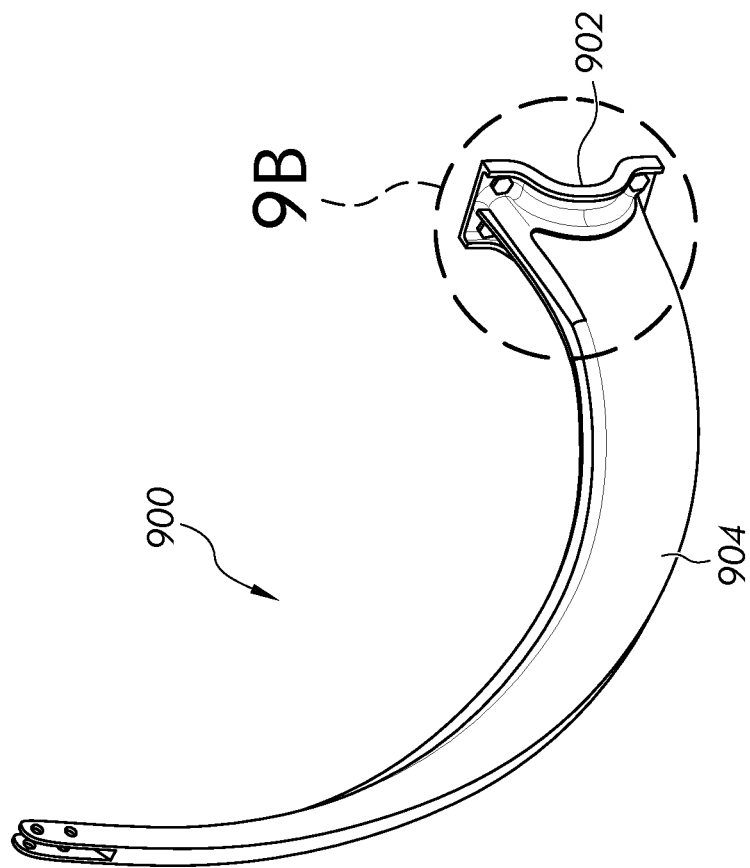
FIG. 9a is an elevated perspective view of a needle assembly, according to one embodiment.

Referring now to FIGS. 9a and 9b, another embodiment of the present disclosure may utilize a similar base 902 as those described herein but implement stamped side sheets 904 instead of a core. The stamped side sheets 904 may provide a significantly lighter construction while still allowing for an engineered, shear-able contact region at the base 902. In one example of this embodiment, the needle 900 may have side sheets 904 formed of a separate material than the base 902. In yet another example of this disclosure, the side sheets 904 may be formed of the same material as the base 902 and be coupled thereto along a seam 906. The seam 906 may provide a location to couple the side sheets 904 to the base 902 via welds, adhesive, braising, fasteners, or the like.

In one aspect of this embodiment, the side sheets 904 may be fastened to the base 902 along the seam 906 to provide a severance location along the seam 906. The severance location may be the location along which the needle 900 will most likely sever in the event that the needle 900 experiences an unintended force during the wrapping operation. More specifically, the severance location along the seam 906 may be such that if the needle 900 is trapped in the compression chamber 140 and contacted by the plunger 146 or otherwise bound in the compression chamber 140, the needle 900 may separate at the base 902 along the seam 906 to allow the remaining needles of the delivery device to return to the lowered position. Accordingly, the seam 906 of the needle 900 may be designed to allow the base 902 to separate from the remaining portions of the needle 900 when unexpected forces are experienced by the needle 900.

In one example of the needle 900 of FIG. 9, the side sheets 904 may be coupled to one another along a central portion 908. More specifically, the needle 900 may have a first side 910 and a second side 912 that are formed independently of one another. The first and second sides 910, 912 may be coupled to one another along the central portion 908. More specifically, the first side 910 may be coupled to the second side 912 utilizing welds, adhesives, braising, soldering, fasteners, or any other known coupling technique along the central portion 908.

Similarly, the needle 900 may have a band 914 positioned between the first and second sides 910, 912. The band 914 may provide a channel or the like to guide the binding material there between as described above. Further, the band 914 may provide a location to couple the first and second sides 910, 914 to one another at a radially outer portion of needle 900. The band 914 may be coupled to the first and second sides 910, 912 utilizing welds, adhesives, braising, soldering, fasteners, or any other known coupling method. Accordingly, in one example of a cross-section of the needle 900, the central portion 908 may couple the first and second sides 910, 912 to one another on one end while the band 914 may couple the first and second sides 910, 912 to one another on an opposite end.

Figure 10:
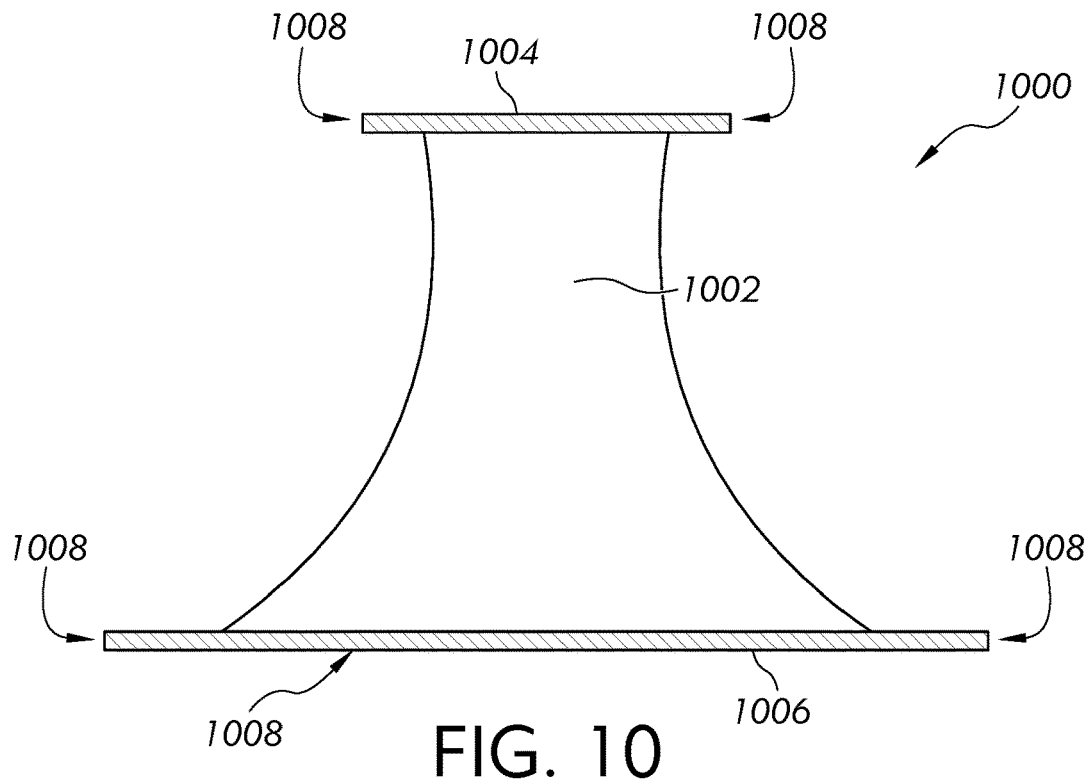
FIG. 10 is a cross-sectional view of a needle assembly, according to one embodiment.

Referring now to FIG. 10, yet another embodiment of the present disclosure is illustrated. FIG. 10 may represent an exemplary cross-section of a needle 1000 that is similar to the needle 700 of FIG. 7. Accordingly, while no base or tip may be specifically illustrated in FIG. 10, this disclosure considers applying any of the base and tip embodiments disclosed herein to the needle 1000 having the cross-section illustrated in FIG. 10.

The needle 1000 may have a core 1002 formed of a first material and an inner surface 1004 and an outer surface 1006 formed of a second material. In one aspect of this disclosure, the first material of the core 1002 may be a carbon fiber and fiberglass reinforced resin, thermoplastic, 3D printed resin or filament to name a few non-exclusive examples. Alternatively, the inner and outer surface 1004, 1006 may be formed of an aluminum or a ferrous metallic material such as steel or the like. Further, the inner and outer surface 1004, 1006 may cover all expected wear zones 1008 of the needle 1000. More specifically, the inner and outer surface 1004, 1006 may be specifically sized to contact any portions of the slots 139, 149, 141 that may be encountered during a binding operation. In other words, the inner and outer surfaces 1004, 1006 are sized to prevent the core 1002 from contacting other portions of the baler 100 during operation to thereby reduce wear to the core 1002.

Figure 7:
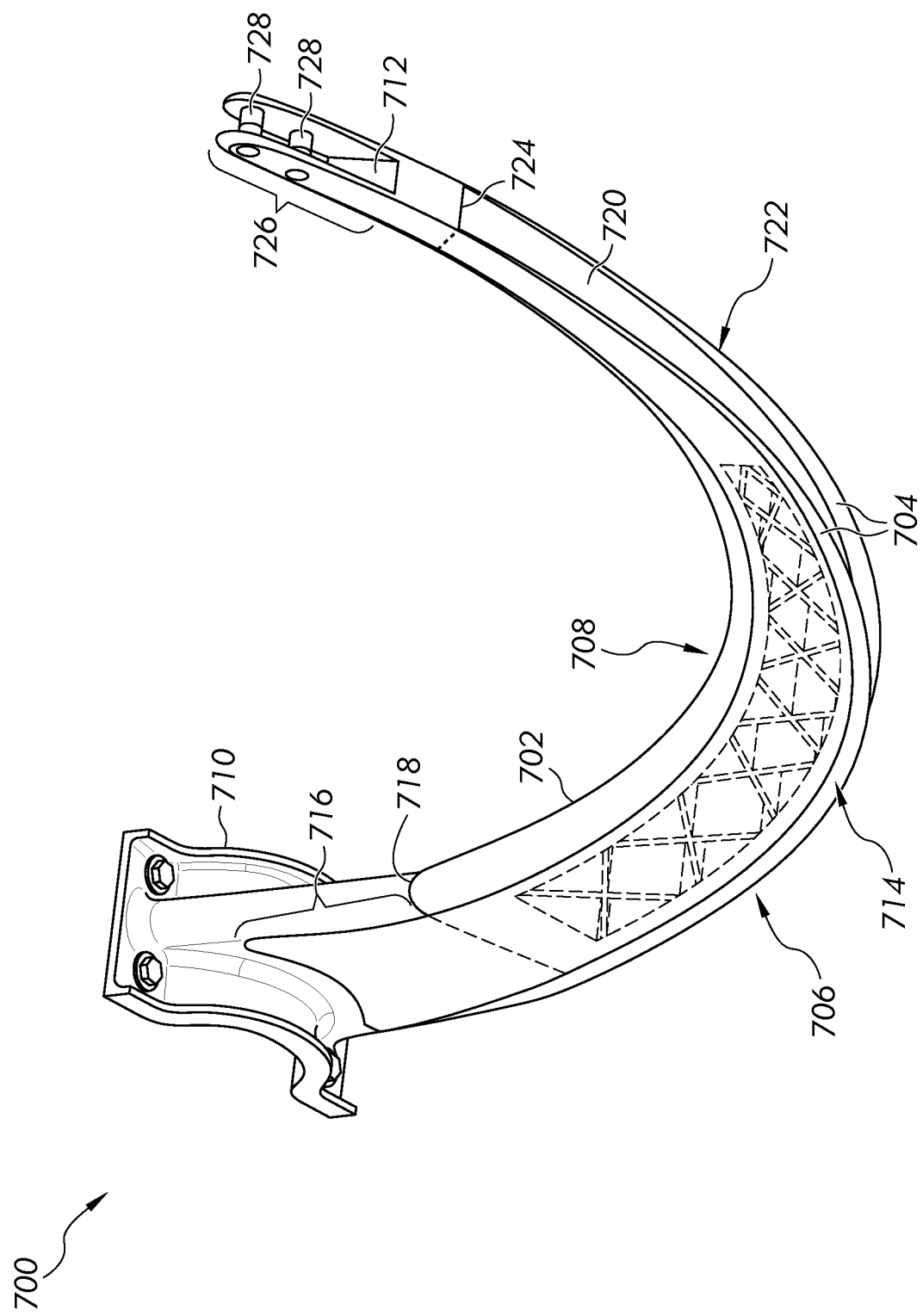
FIG. 7 is an elevated perspective view of a needle assembly, according to one embodiment.

In another aspect of this disclosure, the outer surface 1006 may also prevent wear on the needle 1000 similarly to the band 720 of FIG. 7. More specifically, the outer surface 1006 may protect the core 1002 both from contacting the slots 139, 149, 141 and from contacting the binding material during a binding operation. Accordingly, the inner and outer surface 1004, 1006 may be formed of a material that substantially resists wear from the binding material and the remaining components of the baler 100 during a baling operation.

Figure 11:
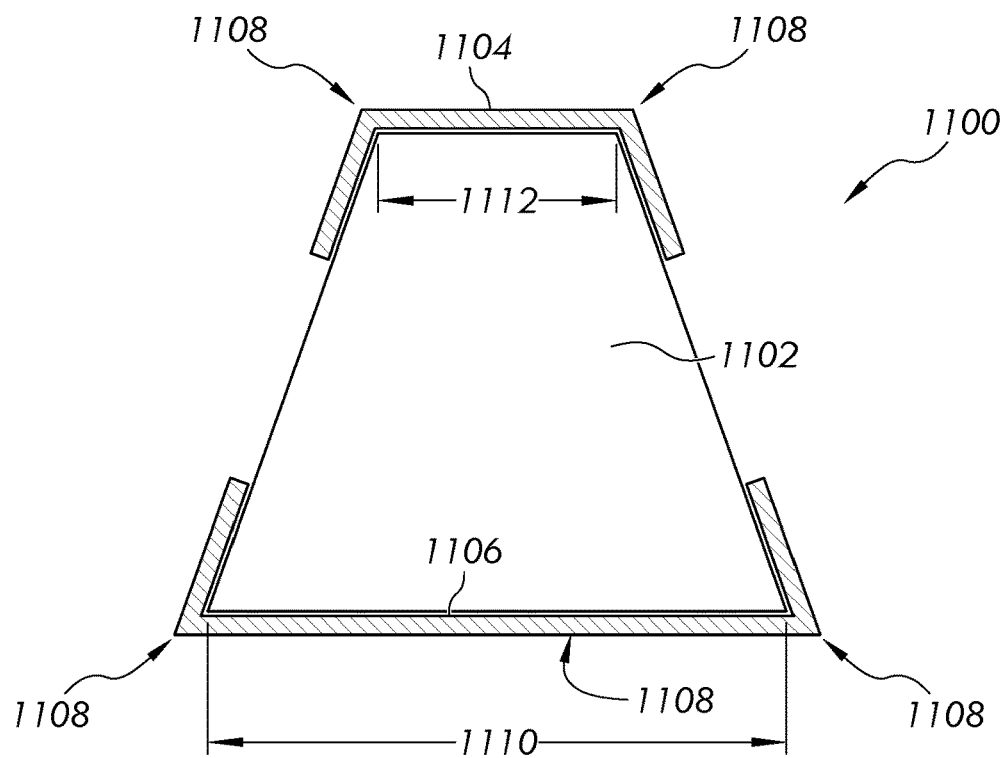
FIG. 11 is a cross-sectional view of a needle assembly, according to one embodiment.

Similarly FIG. 11, is yet another embodiment of the present disclosure that represents an exemplary cross-section of a needle 1100 that is similar to the needle 700 of FIG. 7. Accordingly, while no base or tip may be specifically illustrated in FIG. 11, this disclosure considers applying any of the base and tip embodiments disclosed herein to the needle 1100 illustrated in FIG. 11.

The needle 1100 may have a core 1102 formed of a first material and an inner surface 1104 and an outer surface 1106 formed of a second material. In one aspect of this disclosure, the first material of the core 1102 may be a carbon fiber and fiberglass reinforced resin, thermoplastic, 3D printed resin or filament to name a few non-exclusive examples. Alternatively, the inner and outer surface 1104, 1106 may be formed of aluminum or a ferrous metallic material such as steel or the like.

Further, the inner and outer surface 1104, 1106 may cover all expected wear zones 1108 of the needle 1100. More specifically, the inner and outer surface 1104, 1106 may be specifically sized to contact any portions of the slots 139, 149, 141 that may be encountered during a binding operation. In other words, the inner and outer surfaces 1104, 1108 are sized specifically to prevent the core 1102 from contacting other portions of the baler 100 during operation to thereby reduce wear to the core 1102.

In another aspect of this disclosure, the outer surface 1106 may also prevent wear on the needle 1100 similarly to the band 720 of FIG. 7. More specifically, the outer surface 1106 may protect the core 1102 both from contacting the slots 139, 149, 141 and from contacting the binding material during a binding operation. Accordingly, the inner and outer surface 1104, 1106 may be formed of a material that substantially resists wear from the binding material and the remaining components of the baler 100 during a baling operation.

In one aspect of the needle 1100, the inner and outer surface 1104, 1106 may be coupled to the core 1102 utilizing adhesives, fasteners, or any other known coupling method. Further, the outer surface 1106 may have a dovetail cross-section that allows the outer surface 1106 to be slidably coupled to the core 1102. While not specifically shown, in another embodiment the inner surface 1104 may also have a dovetail shaped cross section that corresponds with a dovetail shaped cross section of the core 1102. Accordingly, the inner and outer surfaces 1104, 1106 may be coupled to the core 1102 using many different coupling techniques.

Also illustrated in FIG. 11 is an outer width 1110 and an inner width 1112. The outer width 1110 may be the cross-sectional width of the core 1102 at a radially outermost portion of the core 1102 and the inner width may be the cross-sectional width of the core 1102 at a radially innermost portion of the core 1102. In the embodiment of FIG. 11, the inner width 1112 may be less than the outer width 1110. By creating an inner width 1112 that is less than the outer width 1110, the stability of the core 1102, and in turn the needle 1100 is increased and unintended lateral movement of the needle 1100 during a binding operation is reduced. The increased stability creates more consistent travel of the needles 1100 through the respective slots 139, 149, 141 during a binding operation among other benefits.

The outer width 1110 and inner width 1112 may also be reduced as the needle 1100 extends farther from the base and towards the tip. More specifically, the outer width 1110 may have a slight taper between the base of the needle 1100 and the tip. Similarly, the inner width 1112 may have a slight taper between the base of the needle 1100 and the tip. Accordingly, in one aspect of this embodiment, the needle 1100 generally has a larger cross-sectional area by the base of the needle 1100 compared to the area by the tip of the needle 1100 due to the tapered outer and inner widths 1110, 1112.

While the inner and outer width 1112, 1110 are specifically illustrated with reference to FIG. 11, the embodiments of at least FIGS. 7, 8, and 10 also have a cross-sectional inner width that is less than an outer width. Accordingly, this disclosure considers implementing the larger outer width relative to the inner width for any embodiment discussed herein.

Figure 12:
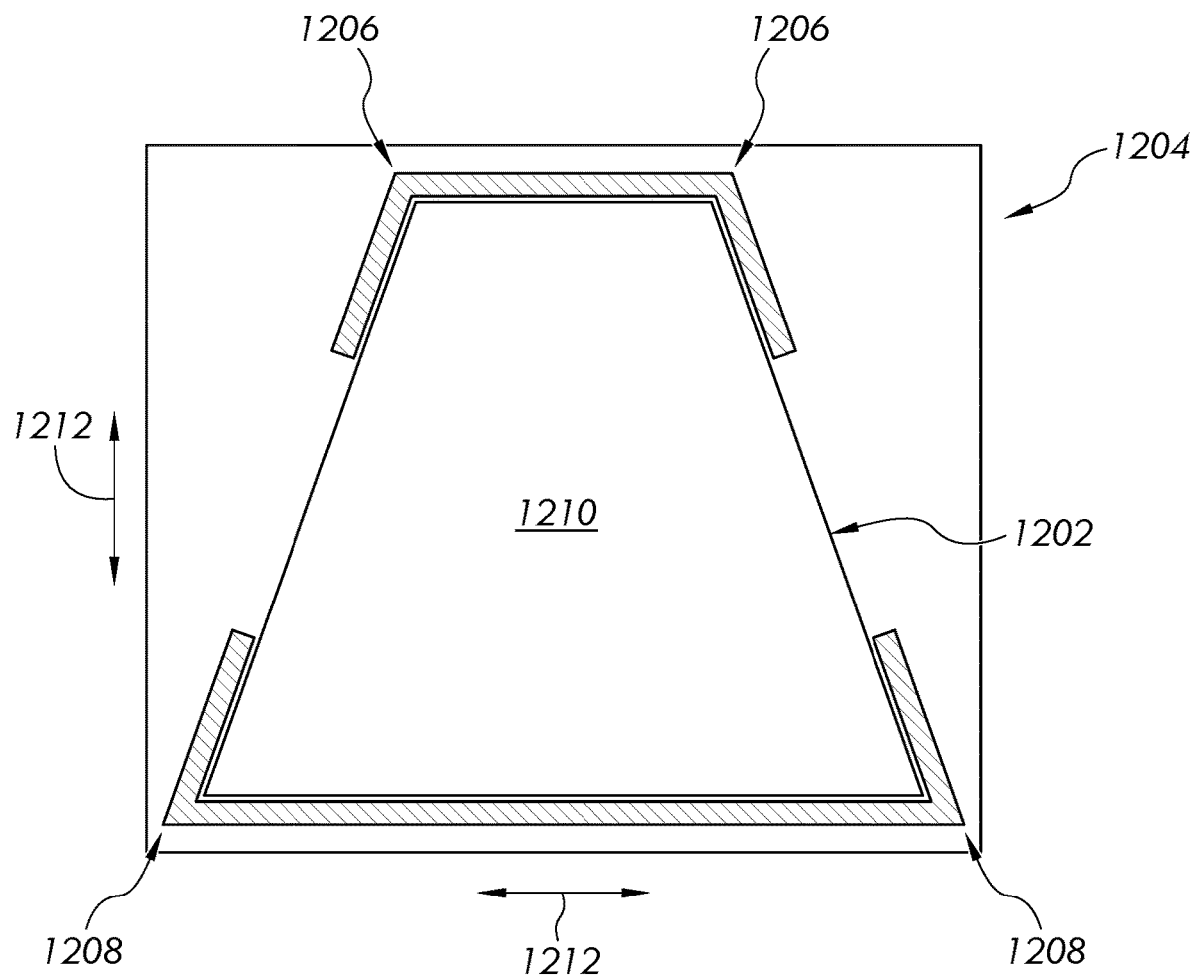
FIG. 12 is a cross-sectional view of a needle assembly in a slot, according to one embodiment.

Referring now to FIG. 12, a cross-sectional view of a needle 1202 positioned through a slot 1204 is illustrated. The slot 1204 may be representative of any of the slots 139, 149, 141 discussed herein and is being shown only as one non-exclusive example of wear zones 1206, 1208 of the needle 1202. More specifically, any of the side sheets 704 or surfaces 1004, 1006, 1104, 1106, discussed herein may be positioned along a core 1210 of the needle 1202 to substantially protect the core 1210 of the needle 1202 from contacting the surrounding slot 1204.

As illustrated in FIG. 12, the needle 1202 may be intended to fit through a central portion of the slot 1204 without substantially contacting the slot 1204. However, during operation, vibrational inputs, debris, elastic deformation, and other mechanical forces may act on the needle 1202 to move it in any combination of directions 1212 relative to the slot 1204. To protect the core 1210 from contacting the walls of the slot 1204, the side sheets 704 or surfaces 1004, 1006, 1104, 1106 may have the wear zones 1206, 1208 positioned at every likely point of contact between the needle 1202 and the walls of the slot 1204 in which the needle 1202 is placed. Accordingly, when the binding operation is implemented any contact between the needle 1202 and any corresponding slots is along the wear zones 1206, 1208 wherein the material properties of the needle 1202 at the wear zones 1206, 1208 are intended to address the expected contact.

In short, this disclosure teaches utilizing a relatively light core for a needle to reduce the weight of the needle and increase overall speed and efficiency of the baler. The core is protected by an additional and often different material along the expected wear zones of the needle. The additional material along the wear zones ensures the core material is not damaged during operation wherein contact between the needle and portions of the slots is possible. Accordingly, this disclosure teaches at least a lightweight, rigid needle assembly that reduces wear.

The terminology used herein is for the purpose of describing particular embodiments or implementations and is not intended to be limiting of the disclosure. As used herein, the singular forms "a", "an" and "the" are intended to include the plural forms as well, unless the context clearly indicates otherwise. It will be further understood that the any use of the terms "has," "have," "having," "include," "includes," "including," "comprise," "comprises," "comprising," or the like, in this specification, identifies the presence of stated features, integers, steps, operations, elements, and/or components, but does not preclude the presence or addition of one or more other features, integers, steps, operations, elements, components, and/or groups thereof.

One or more of the steps or operations in any of the methods, processes, or systems discussed herein may be omitted, repeated, or re-ordered and are within the scope of the present disclosure.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A multi-material needle assembly for a baler, comprising:
    a core formed from a first material that extends from a base end of the needle assembly to a tip end of the needle assembly, and the core has a curved shape with a radially inner portion, a radially outer portion, and first and second sides that extend from the radially inner portion to the radially outer portion, where the radially inner portion and the radially outer portion are on opposite sides of the core and the first and second sides are on opposite sides of the core;
    a first surface formed of a second material and coupled to the radially inner portion of the core; and
    a second surface formed of the second material and coupled to the radially outer portion of the core;
    wherein the first material is different from the second material;
    wherein, the first and second sides of the core separate the first and second surfaces on opposite sides of the core;
    wherein, the first surface is positioned at least partially along a wear zone of the core, and the first and second surfaces extend along the core from the base end to the tip end of the needle assembly; and
    wherein at least a portion of each of the first side and the second side of the core that extended from the base end to the tip end of the needle assembly is free of the second material.

2. The needle assembly of claim 1, wherein the first and second surfaces surround the core from the base end to the tip end of the needle assembly on opposite sides of the core.

3. The needle assembly of claim 1, further wherein the first surface is coupled to the core with adhesives.

4. The needle assembly claim 1, further wherein the first material is a composite and the second material is a metal.

5. The needle assembly of claim 1, further wherein the core is coupled to a base at a seam; and the base is part of the base end of the needle assembly.

6. The needle assembly of claim 5, further wherein the base is formed of a different material than the first material.

7. The needle assembly of claim 6, further wherein the first surface is coupled to both the core and the base.

8. The needle assembly of claim 1, further wherein the core is coupled to a tip at a tip seam; and the tip is part of the tip end of the needle assembly.

9. The needle assembly of claim 8, further wherein the tip is formed from a different material than the core.

10. The needle assembly of claim 9, further wherein the first surface is coupled to both the core and the tip.

11. A needle assembly for a baler, comprising:
- a core formed from a first material that extends from a base end of the needle assembly to a tip end of the needle assembly, and the core has a radially inner portion, a radially outer portion, and first and second sides that extend from the radially inner portion to the radially outer portion, where the radially inner portion and the radially outer portion are on opposite sides of the core and the first and second sides are on opposite sides of the core;
- a first surface formed from a second material, the first surface coupled to the core along a first wear zone of the needle assembly; and
- a second surface formed of the second material, the second surface coupled to the core along a second wear zone of the needle assembly, and the second surface is spaced from the first surface;
- wherein the first material is different from the second material;
- wherein, the first and second sides of the core separate the first and second surfaces on opposite sides of the core;
- wherein, the first wear zone is a portion of the needle assembly positioned adjacent to one side of an opening of the baler during a knotting operation and the second wear zone is a portion of the needle assembly positioned adjacent to an opposite side of the opening of the baler during the knotting operation, and the first and second surfaces extend from the base end to the tip end of the needle assembly; and
- wherein at least a portion of each of the first side and the second side of the core that extends from the base end to the tip end of the needle assembly is free of the second material.

12. The needle assembly of claim 11, further wherein the first material is a carbon fiber and fiberglass reinforced resin, thermoplastic, 3D printed resin or filament.

13. The needle assembly of claim 12, further wherein the second material is formed of a ferrous metallic material.

14. The needle assembly of claim 11, further wherein
- the first surface has a first width and is positioned along a radially inner portion of the needle assembly;
- the second surface has a second width and is positioned along a radially outer portion of the needle assembly; and
- the first width is less than the second width.

15. The needle assembly of claim 14, further wherein the core has a cross-sectional area, and the cross-sectional area of the core decreases from the base end to the tip end of the needle assembly.

16. The needle assembly of claim 11, further comprising a band positioned along a radially outer portion of the core wherein the band is formed of a resistant material and configured to resist wear and guide a binding material there along.

17. A multi-material needle assembly sized to be positioned through a slot of a baler during a binding operation, comprising:
- a core formed from a first material that extends from a base end of the needle assembly to a tip end of the needle assembly, and the core has an inner side and an outer side where the inner side is opposite from the outer side, and the core has a first surface and a second surface that extend from the inner side to the outer side between the base end and the tip end of the needle assembly where the first surface is opposite from the second surface;
- a first side formed of a second material and coupled to the inner side of the core, and the first side extends from the base end to the tip end of the needle assembly; and
- a second side formed of the second material and coupled to the outer side of the core, and the second side extends from the base end to the tip end of the needle assembly, and the second side spaced from the first side;
- wherein the first material is different from the second material;
- wherein, the first and second surfaces of the core separate the first and second sides on opposite sides of the core;
- wherein, the first and second sides are positioned along wear zones of the needle assembly that are positioned adjacent to opposite sides of the slot during the binding operation; and
- wherein at least a portion of each of the first and second surfaces of the core that extends from the base end to the tip end of the needle assembly is free of the second material.

18. The multi-material needle of claim 17, further wherein the core has a truss-like structure formed therein between the first side and the second side.

19. The multi-material needle of claim 17, further wherein the core extends between a base seam of a base member to a tip seam of a tip member, where the base member is at the base end of the needle assembly and the tip member is at the tip end of the needle assembly.

20. The multi-material needle of claim 19, further wherein the base member and the tip member are formed of a different material than the first material.

* * * * *